(12) United States Patent
Kim et al.

(10) Patent No.: US 10,019,991 B2
(45) Date of Patent: Jul. 10, 2018

(54) APPARATUS AND METHOD FOR SPEECH RECOGNITION

(71) Applicant: Electronics and Telecommunications Research Institute, Daejeon (KR)

(72) Inventors: Seung Hi Kim, Daejeon (KR); Sang Hun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 128 days.

(21) Appl. No.: 13/803,141

(22) Filed: Mar. 14, 2013

(65) Prior Publication Data

US 2013/0297304 A1 Nov. 7, 2013

(30) Foreign Application Priority Data

May 2, 2012 (KR) .................. 10-2012-0046426
Oct. 25, 2012 (KR) .................. 10-2012-0118892

(51) Int. Cl.
*G10L 21/00* (2013.01)
*G10L 25/00* (2013.01)
*G10L 15/22* (2006.01)

(52) U.S. Cl.
CPC ........ *G10L 15/22* (2013.01); *G10L 2015/228* (2013.01)

(58) Field of Classification Search
CPC ..... G10L 15/22; G10L 15/1815; G10L 15/20; G10L 15/08; G10L 17/22; G10L 15/30; G10L 15/265; G10L 15/32; G10L 25/48; G06F 3/04842; G06F 3/0482; G06F 3/0481; G06F 3/167; G06F 17/28; G06F 11/3438; G06F 21/36; G06F 3/0488
USPC .................................. 704/231–257
See application file for complete search history.

(56) References Cited

U.S. PATENT DOCUMENTS

| | | | |
|---|---|---|---|
| 6,012,030 A * | 1/2000 | French-St. George et al. ............... 704/275 |
| 6,453,281 B1 * | 9/2002 | Walters ........ G06F 3/0481 704/200 |
| 6,510,417 B1 * | 1/2003 | Woods ........... H04M 3/4938 379/88.17 |
| 7,043,426 B2 * | 5/2006 | Roberge et al. ........... 704/231 |
| 7,505,911 B2 * | 3/2009 | Roth et al. .................. 704/276 |
| 7,729,913 B1 * | 6/2010 | Lee ............. G06F 17/30654 704/251 |

(Continued)

*Primary Examiner* — Michael Ortiz Sanchez
(74) *Attorney, Agent, or Firm* — Staas & Halsey LLP

(57) ABSTRACT

Disclosed is an apparatus for speech recognition and automatic translation operated in a PC or a mobile device. The apparatus for speech recognition according to the present invention includes a display unit that displays a screen for selecting a domain as a unit for a speech recognition region previously sorted for speech recognition to a user; a user input unit that receives a selection of a domain from the user; and a communication unit that transmits the user selection information for the domain. According to the present invention, the apparatus for speech recognition using an intuitive and simple user interface is provided to a user to enable the user to easily select/correct a designation domain of a speech recognition system and improve accuracy and performance of speech recognition and automatic translation by the designated system for speech recognition.

19 Claims, 12 Drawing Sheets

(56) References Cited

U.S. PATENT DOCUMENTS

| | | | |
|---|---|---|---|
| 8,255,224 B2* | 8/2012 | Singleton et al. ............ 704/275 |
| 8,447,607 B2* | 5/2013 | Weider .............. G06F 17/30864 |
| | | | 704/250 |
| 2002/0046019 A1* | 4/2002 | Verhagen ............ G06F 17/2785 |
| | | | 704/9 |
| 2002/0087314 A1* | 7/2002 | Fischer .................. G10L 15/07 |
| | | | 704/255 |
| 2002/0120455 A1* | 8/2002 | Nakata ................ G06F 3/04812 |
| | | | 704/275 |
| 2003/0023437 A1* | 1/2003 | Fung ............................ 704/236 |
| 2003/0088413 A1* | 5/2003 | Gomez .................. G10L 15/22 |
| | | | 704/246 |
| 2003/0200094 A1* | 10/2003 | Gupta .................. G10L 15/063 |
| | | | 704/270.1 |
| 2004/0049388 A1* | 3/2004 | Roth et al. .................... 704/251 |
| 2005/0049880 A1* | 3/2005 | Roth et al. .................... 704/277 |
| 2005/0182628 A1* | 8/2005 | Choi ...................... G10L 15/08 |
| | | | 704/252 |
| 2006/0143007 A1* | 6/2006 | Koh ........................ G10L 15/22 |
| | | | 704/243 |
| 2006/0287858 A1* | 12/2006 | Cross, Jr. ................ G10L 15/22 |
| | | | 704/257 |
| 2007/0168462 A1* | 7/2007 | Grossberg .............. G06Q 30/02 |
| | | | 709/217 |
| 2007/0219798 A1* | 9/2007 | Wang .................... G10L 15/063 |
| | | | 704/257 |
| 2008/0046844 A1* | 2/2008 | Sugie ................. G01C 21/3611 |
| | | | 715/856 |
| 2008/0168377 A1* | 7/2008 | Stallings ............. H04L 12/4625 |
| | | | 715/772 |
| 2008/0319748 A1* | 12/2008 | Nakano ............... G10L 15/1822 |
| | | | 704/251 |
| 2009/0089251 A1* | 4/2009 | Johnston ............ G06F 17/30017 |
| 2009/0287680 A1* | 11/2009 | Paek ................... G06F 17/3064 |
| 2010/0312547 A1* | 12/2010 | Van Os .................... G06F 3/167 |
| | | | 704/9 |
| 2011/0289453 A1* | 11/2011 | Takizawa ............. H04N 5/4403 |
| | | | 715/810 |
| 2011/0295603 A1* | 12/2011 | Meisel .......................... 704/246 |
| 2012/0035932 A1* | 2/2012 | Jitkoff et al. ................. 704/254 |
| 2013/0326353 A1* | 12/2013 | Singhal ................... G06F 3/167 |
| | | | 715/728 |

* cited by examiner

[FIG. 1]
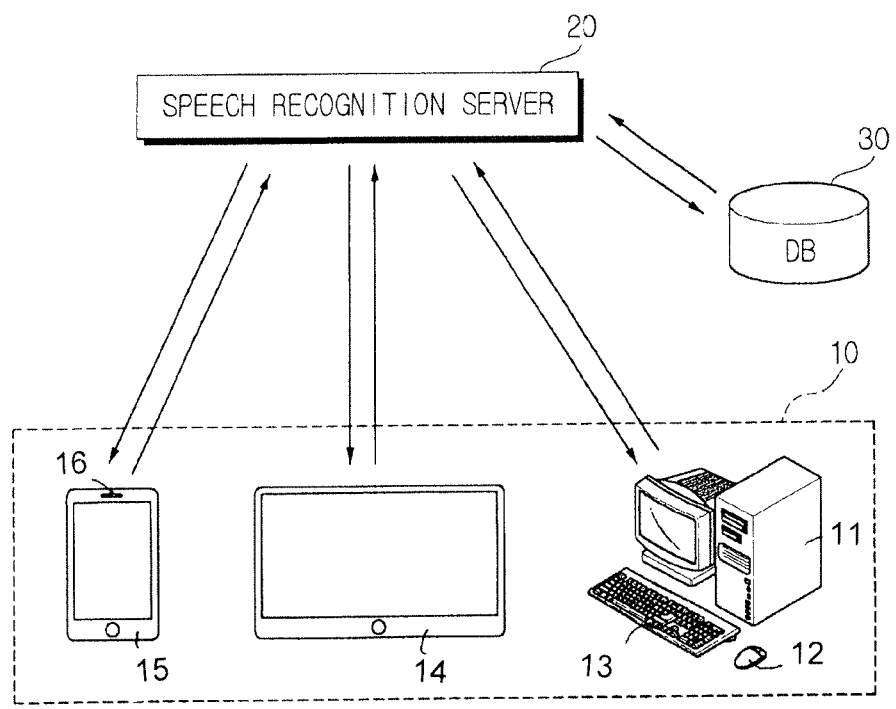

[FIG. 2]
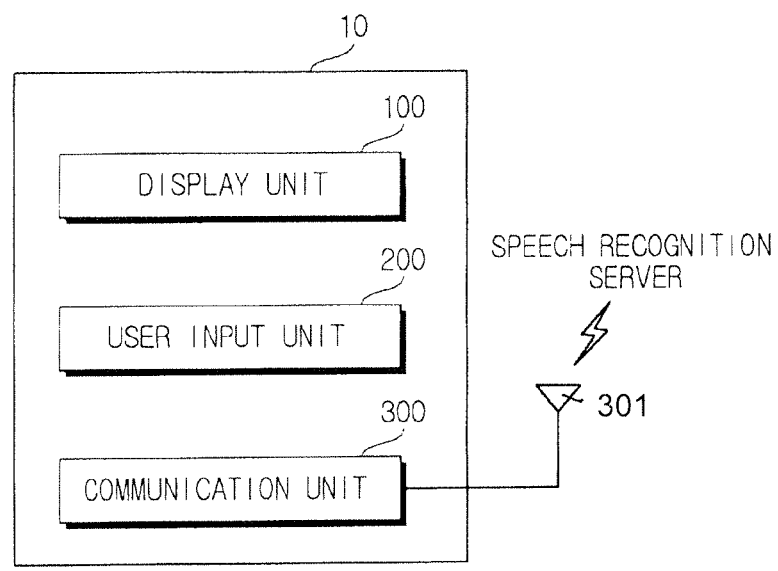

[FIG. 3]
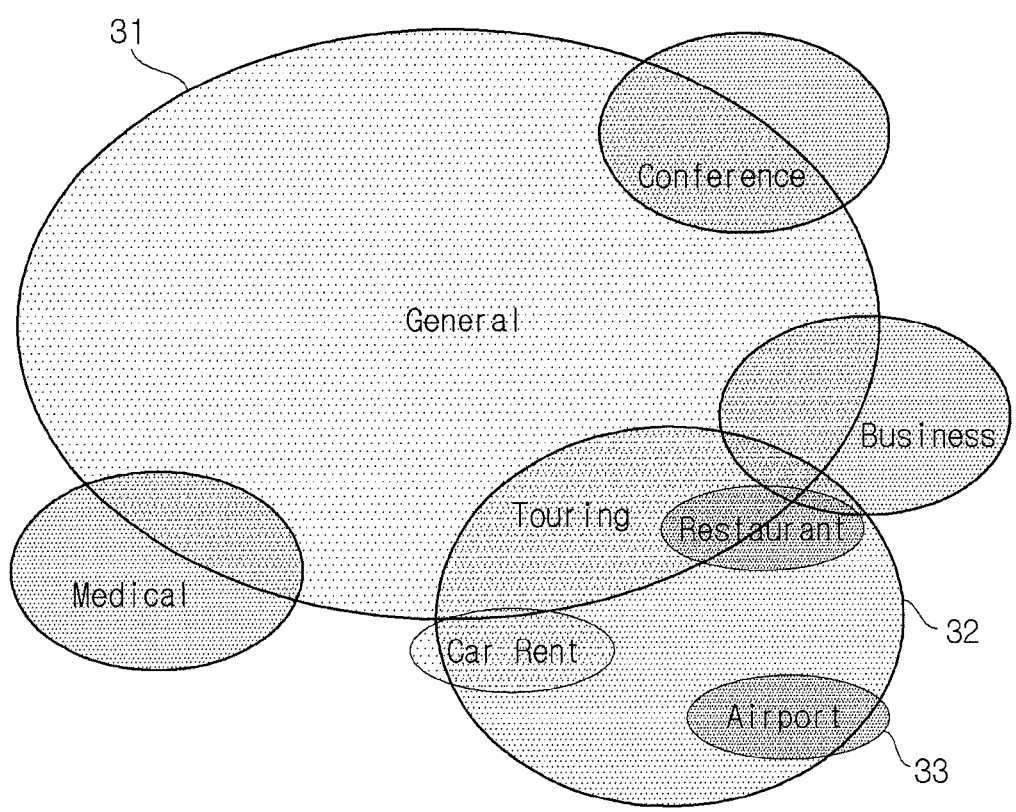

[FIG. 4]
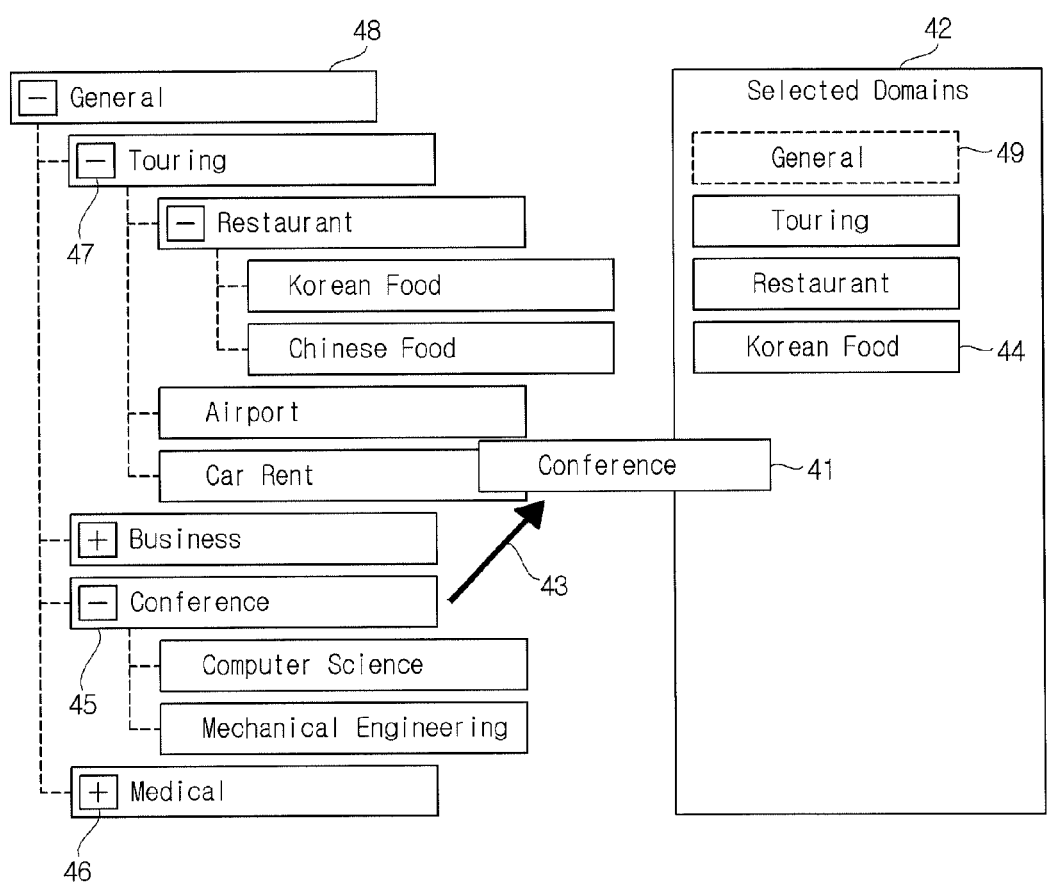

[FIG. 5]
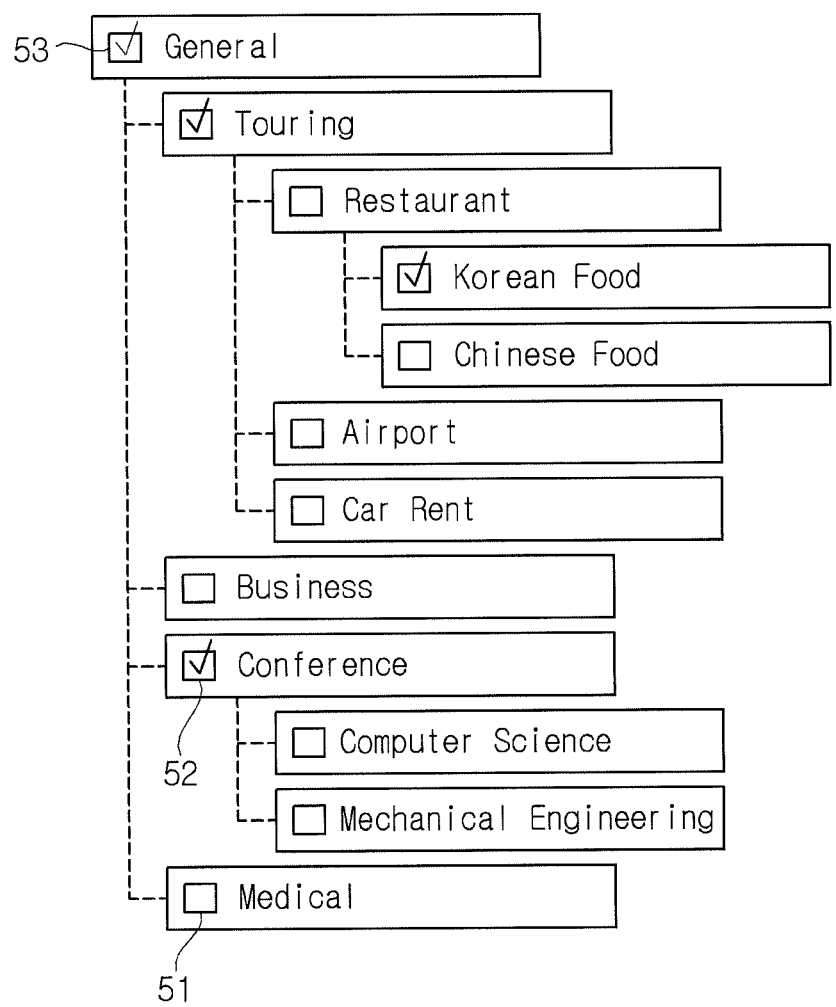

[FIG. 6]
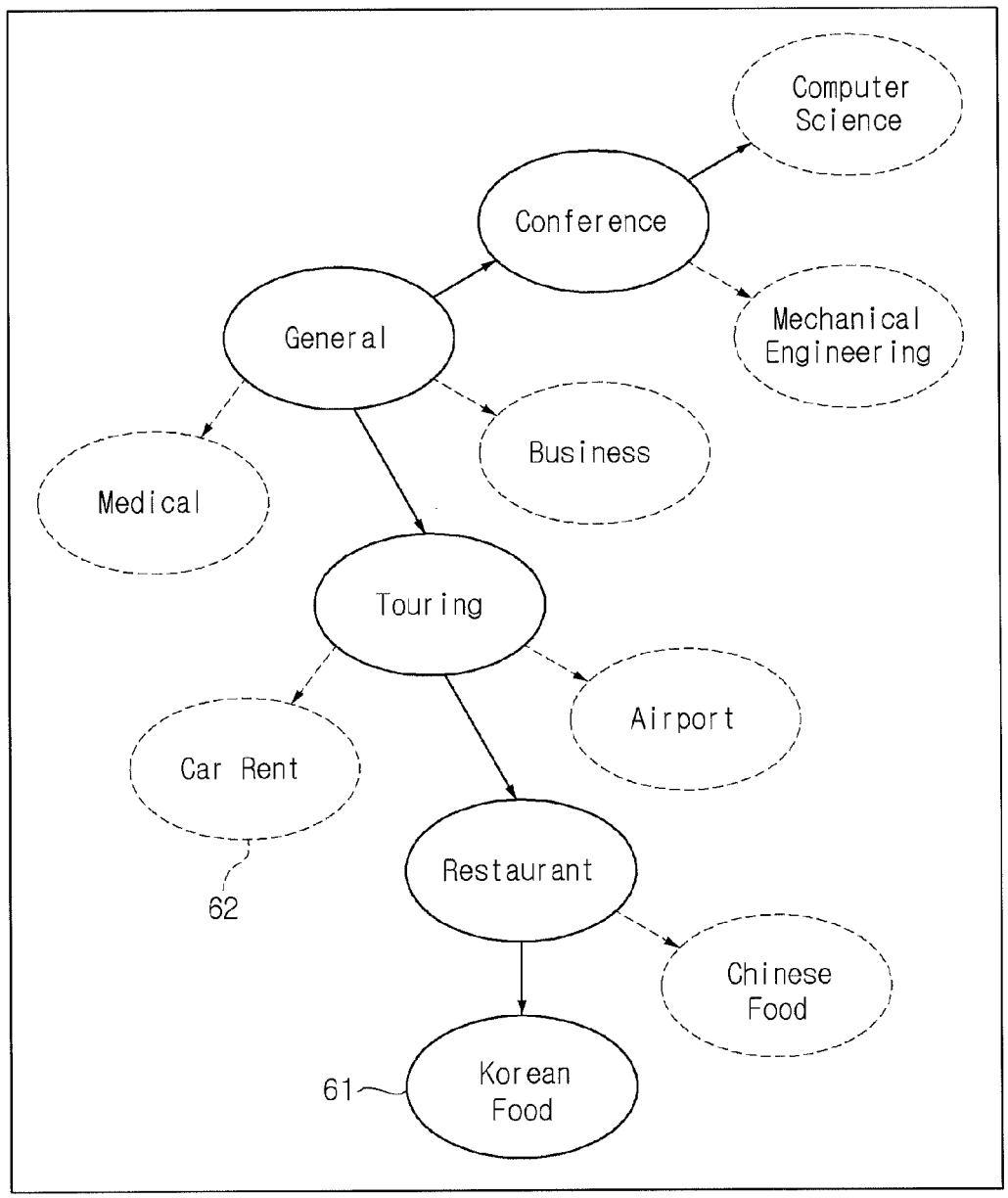

[FIG. 7]
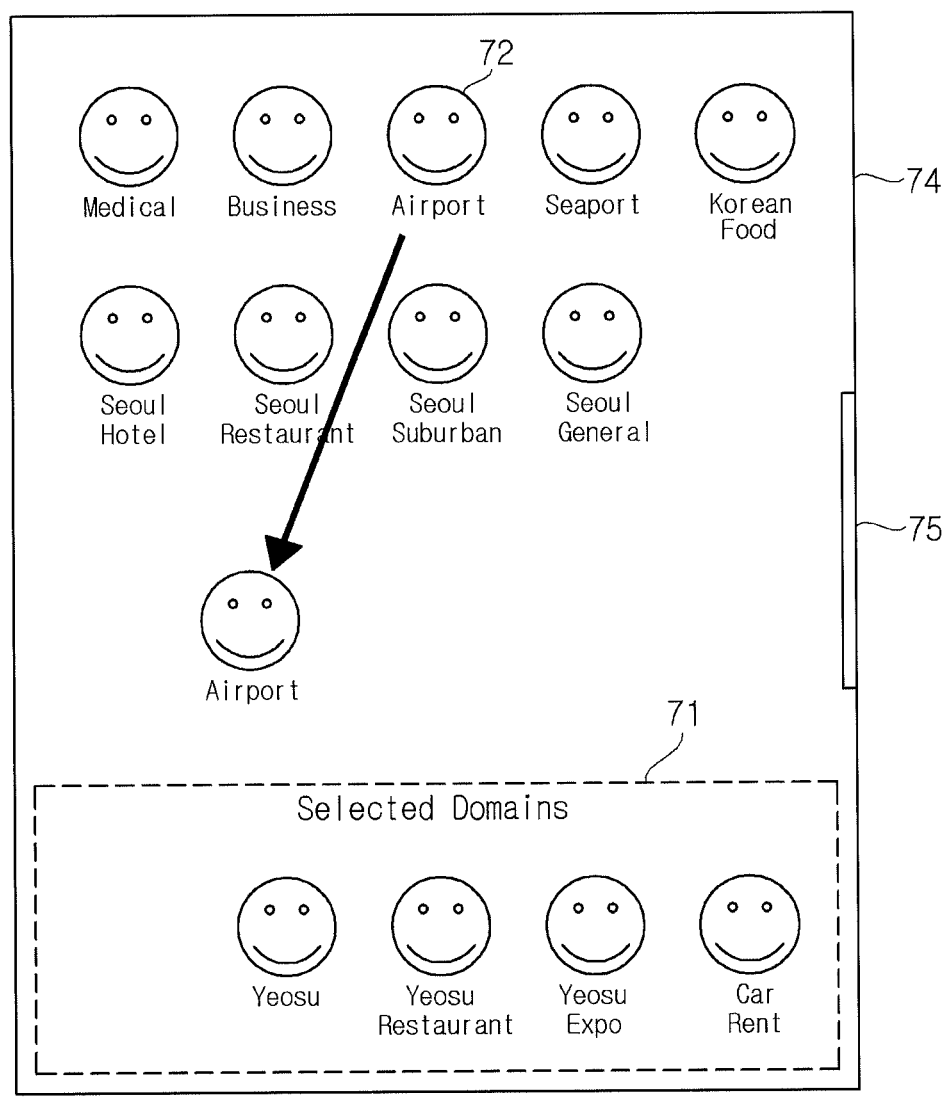

[FIG. 8]
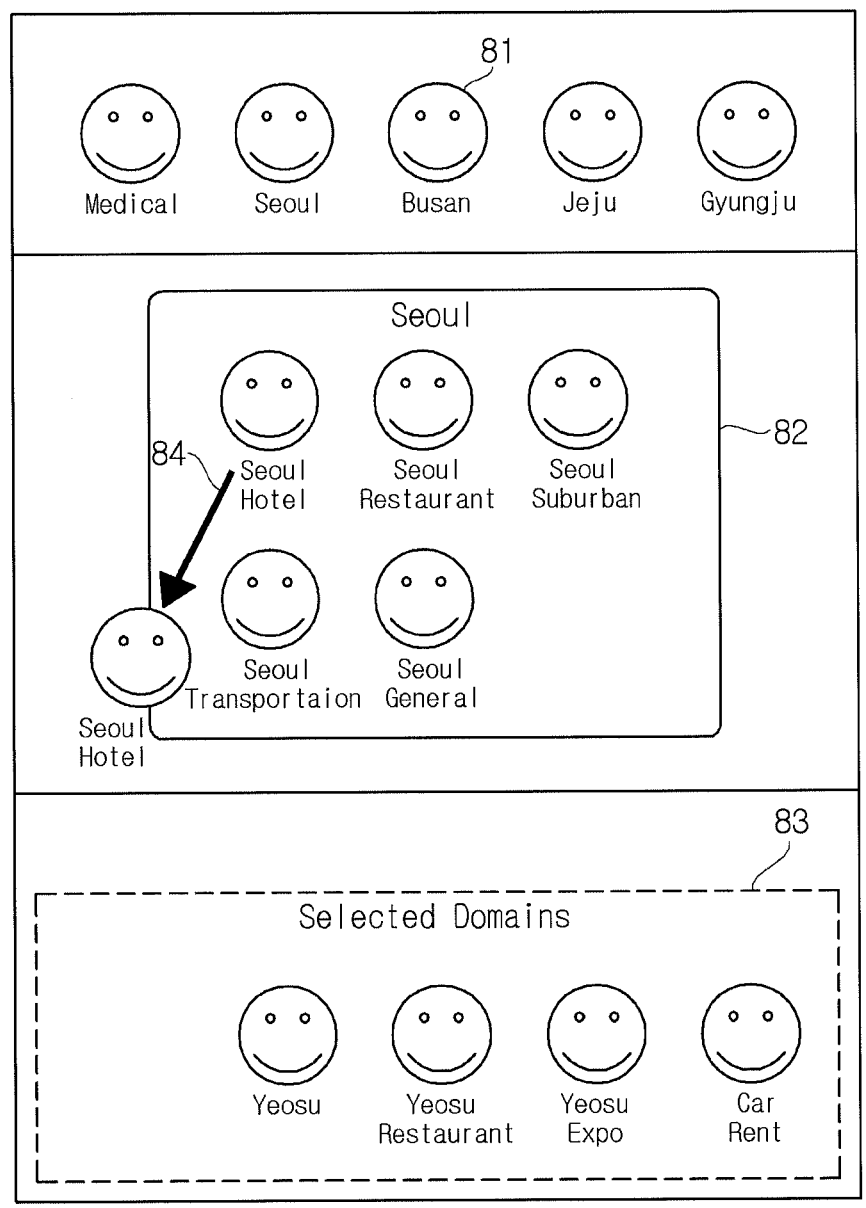

[FIG. 9]
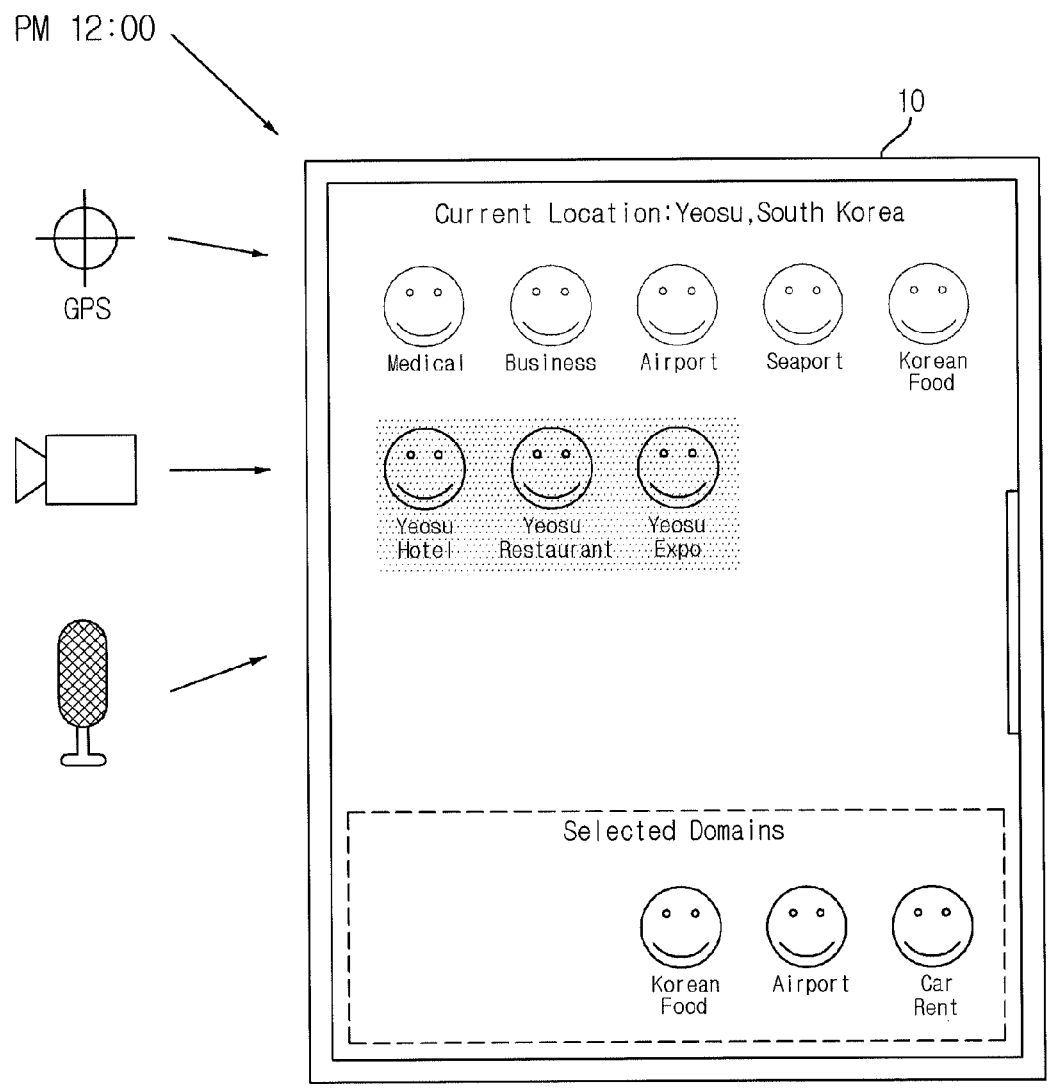

[FIG. 10]
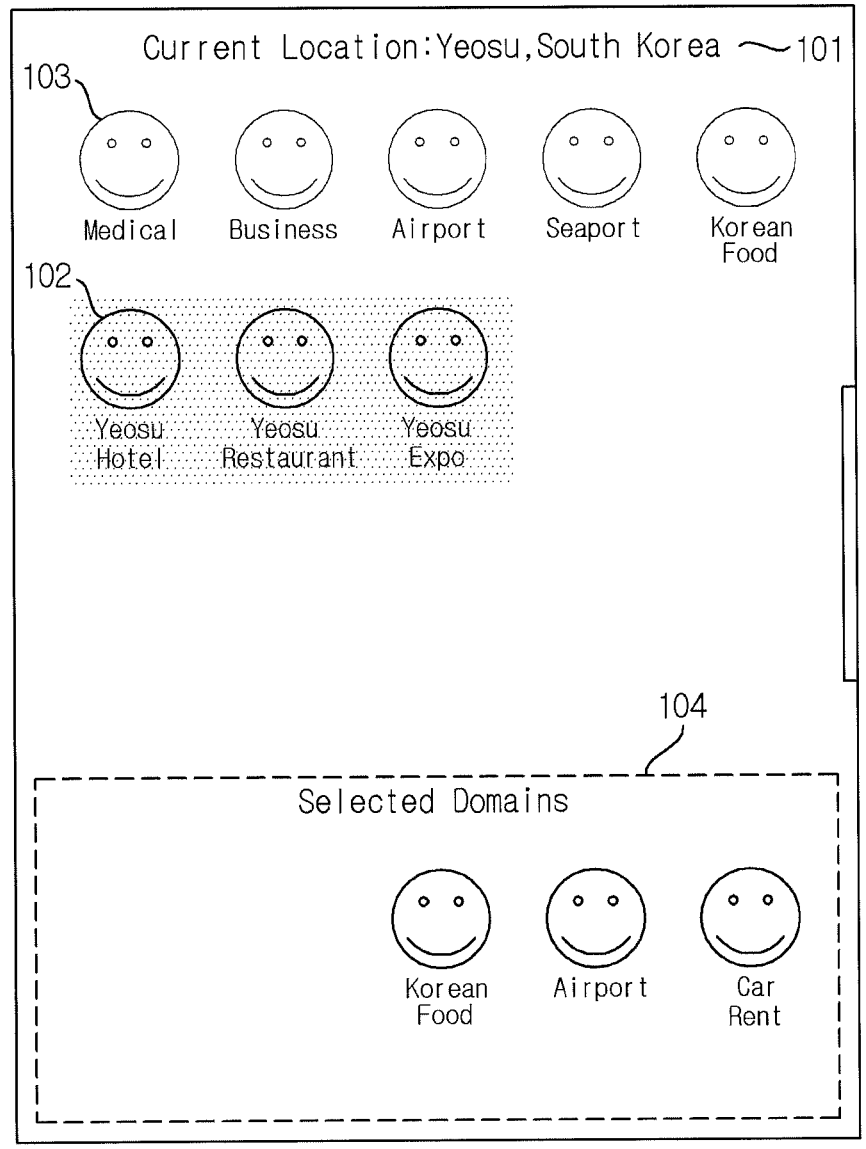

[FIG. 11]
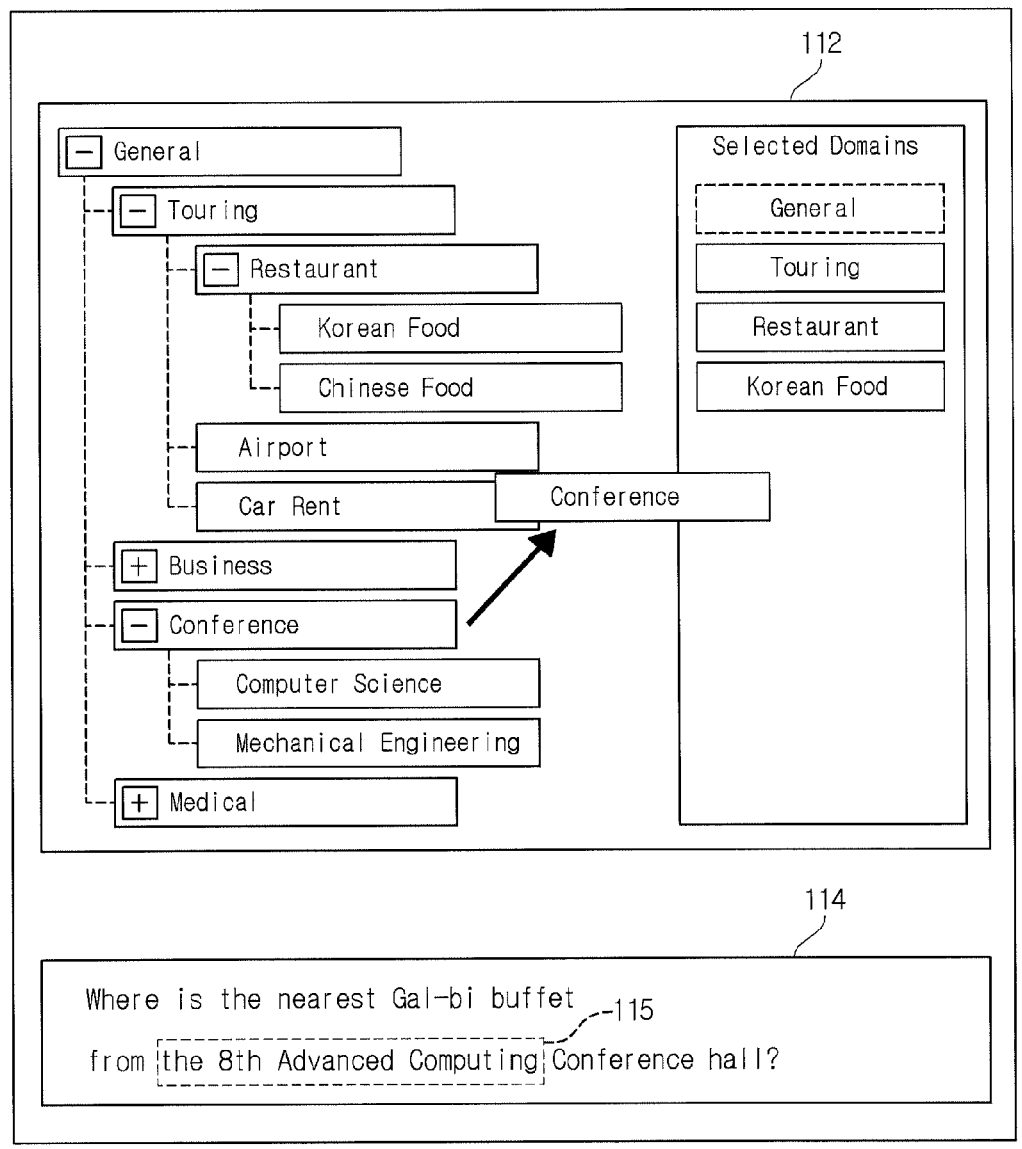

[FIG. 12]
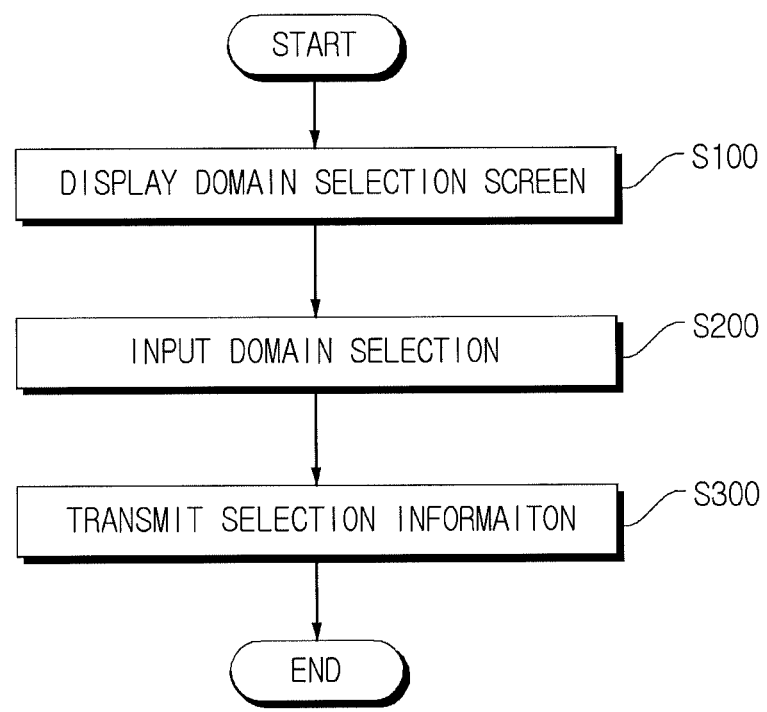

APPARATUS AND METHOD FOR SPEECH RECOGNITION

CROSS-REFERENCE TO RELATED APPLICATIONS

This application claims priority to and the benefit of Korean Patent Application No. 10-2012-0046426 filed in the Korean Intellectual Property Office on May 2, 2012 and the Korean Patent Application No. 10-2012-0118892 filed in the Korean Intellectual Property Office on Oct. 25, 2012, the entire contents of which are incorporated herein by reference.

TECHNICAL FIELD

The present invention relates to an apparatus equipped with a speech recognition function and an automatic interpretation function or a method for speech recognition, and more particularly, to a method of selecting a domain of a database for speech recognition.

BACKGROUND ART

The system for speech recognition or automatic interpretation in the related art is inefficient to train many vocabularies or expressions in various fields and therefore has been trained only for one region, that is, a domain. In most cases, the speech recognition or automatic interpretation application cannot correct the domain designated as default. Even when a user can directly select a domain, there are problems in that it is inconvenient for a user to use the speech recognition or automatic interpretation application and selected contents are very simple. Therefore, there are problems in that adaptation to a speech recognition environment is degraded and accuracy of speech recognition and automatic interpretation is degraded.

SUMMARY OF THE INVENTION

The present invention has been made in an effort to increase accuracy of speech recognition and automatic interpretation by providing a user interface helping to easily select a database, that is, a domain referenced for speech recognition or automatic interpretation to a user and facilitating domain selection depending on the circumferences.

An exemplary embodiment of the present invention provides an apparatus for speech recognition including: a display unit that displays a screen for selecting a domain as a unit for a speech recognition region previously sorted for speech recognition to a user; a user input unit that receives a selection of a domain from the user; and a communication unit that transmits the user selection information for the domain.

According to the exemplary embodiments of the present invention, it is possible to provide the method of intuitively and simply selecting a domain to the user and improve the accuracy and performance of the speech recognition and the automatic interpretation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a diagram illustrating a network for providing a speech recognition service according to an exemplary embodiment of the present invention.

FIG. 2 is a diagram illustrating a configuration of a user terminal according to an exemplary embodiment of the present invention.

FIG. 3 is a diagram illustrating a structure and a relationship of designation domains according to an exemplary embodiment of the present invention.

FIGS. 4 to 11 are diagrams illustrating a screen displayed on a display unit of a user terminal according to an exemplary embodiment of the present invention.

FIG. 12 is a flow chart illustrating a method of designating a speech recognition domain according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described with reference to the accompanying drawings.

FIG. 1 is a diagram illustrating a network configuration for providing a method for speech recognition according to an exemplary embodiment of the present invention.

A user terminal 10 receives speech and domain selection information from a user and transfers the received speech and domain selection information to a speech recognition server 20. The user terminal 10 is equipped with communication functions such as a PC 11, for example, with a mouse 12 and/or a keyboard 13, a notebook 14, a smart phone 15 with a microphone 16, and the like, and may be any computing device that enables a user to input speech or texts.

The speech recognition server 20 performs speech recognition by referring to a data corresponding to a domain selected by a user among reference data for speech recognition stored in a DB 30 through information on the received speech and selected domain. Next, the performed speech recognition result is transmitted to the user terminal 10.

Various data required for the speech recognition server 20 to perform the speech recognition operation are stored in the DB 30 and data referenced during the speech recognition operation, for example, data such as corpus, a language dictionary, and the like, are stored in the DB 30 for each domain.

Hereinafter, the user terminal 10 will be described in more detail with reference to FIG. 2.

As illustrated in FIG. 2, the user terminal 10 according to the exemplary embodiment of the present invention may include a display unit 100, a user input unit 200, and a communication unit 300 with an antenna 301.

The display unit 100 displays information necessary for speech recognition and may display menus for designating a domain referenced for speech recognition to a user. In the present exemplary embodiment, the speech recognition server 20 is a system that receives the speech signal to recognize meanings and performs the speech recognition based on a designation domain that is designated by a user or a general domain.

The general domain is a database that is referenced to support the speech recognition for languages generally used rather than for a specific domain and the designation domain is a database selected automatically or by a user for specific situations so as to support more accurate speech recognition than the foregoing general region. For example, when the input speech relates to touring, the speech recognition may be performed by using a 'touring' domain as a designation domain and the better speech recognition results may be generated than the case in which the general domain is selected.

A concept of the speech recognition domain will be described in more detail with reference to FIG. 3. According to the exemplary embodiment of the present invention, the speech recognition domain may be referred to as the database referenced in a unit classifying the region of the speech recognition, that is, during the speech recognition process.

Referring to FIG. 3, as described above, the speech recognition server 20 may be operated for a general domain 31 as default or by the user selection. Here, the speech recognition server 20 may have a first sub domain 32 as each designation domain and may have second sub domains 33 using the first sub domain 32 as a parent domain. Although not illustrated, the speech recognition server 20 may include third and fourth sub domains by using the second sub domain as the parent domain.

The second sub domains may also substitute some characteristics (words or expressions) of the parent domain and may also have characteristics which the parent domain does not have. Each domain may also overlap each other. For example, two sub domains, for example, a touring domain may partially overlap a business domain that is another domain and a restaurant domain that is a sub domain of the touring domain may partially overlap the business domain.

Hereinafter, a configuration of a screen for selecting a domain displayed on the display unit 100 according to the exemplary embodiment of the present invention will be described with reference to the accompanying drawings.

In the present exemplary embodiment, the domain display unit 100 displays a domain that can be selected or deselected by the user. Referring to FIG. 4, the display unit 100 may display the domain in a hierarchical structure or a tree structure. As illustrated in FIG. 4, each domain may be represented by a label that is a name of the designation domain among the domains.

The general domain is expressed by a label of a name called 'General' and as the sub domain of the general domain, may include a touring domain 47, a business domain, a conference domain 45, and a medicine domain 46 as four sub domains.

The touring-related domain is expressed by a domain 47 having a label of a name called 'Touring' and may include a restaurant domain, an airport domain, and a car rent domain as three sub domains. The restaurant domain is expressed by a domain having a label of a name called 'Restaurant' and may include an additional sub domain according to kinds of restaurants. For example, in the case of FIG. 4, a Korean restaurant domain is expressed by a label called 'Korean Food' and a Chinese restaurant domain is expressed by a label called 'Chinese Food'.

The Korean restaurant domain may include language data for Korean foods and a restaurant name so as to support the speech recognition.

The conference domain may be expressed by a label 45 of a name called 'Conference' and may include a computer engineering domain and a mechanical engineering domain as the sub domain. The computer engineering domain may be expressed by a label called 'Computer Science' and the mechanical engineering domain may be expressed by a label called 'Mechanical Engineering'. In the case of the conference domain, the use frequency of the professional vocabularies is more increased than other fields to subdivide the speech recognition region according to the conference-related fields, thereby increasing the accuracy of recognition and interpretation when the designated speech recognition service is provided.

Hereinafter, in the present exemplary embodiment, the user input unit 200 that receives the selection of the domain for selecting the domain from the user through the domain display unit 100 will be described.

Referring to FIG. 4, in the present exemplary embodiment, the display unit 100 of the user terminal 10 makes the domain regions into a tree structure and displays the domain regions to the user and the user may drag and drop 43 the domain 45 to be selected in a designation domain display region 42 by a mouse or a touch gesture to select the domain. A domain 44 previously selected in the designation domain display region 42 is dragged and dropped outside the region to release the designation.

In this case, a domain tree may display or hide the sub domains by a '+' button 46 or a "−" button 47.

The domains previously selected among the nodes of the tree are expressed differently to enable a user to avoid the unnecessary re-selection. The general region of the selected designation domain display region 42 is previously selected and therefore is displayed differently from other domains, thereby enabling the user to recognize the fact.

Referring to FIG. 4, as the domain for the designation domain previously selected in the designation possible domain display region of the current display unit, the 'General', 'Touring', 'Restaurant', and 'Korean Food' are displayed 48 differently from the domain that is not selected, such that the selected domain may be informed to the user. The selected domains are displayed on the designation domain display region 42. Among them, the 'General' domain 48 is basically the selected domain and the selection thereof cannot be released. Therefore, the fact is informed to the user by differently expressing 49 the 'General' domain 48 from other selected domains.

FIG. 4 illustrates that the 'Conference' domain 45 is dragged 43 to the designation domain display region 42 so as for the current user to designate the conference-related domain. In the present exemplary embodiment, it is also possible to select the designation domain using a menu call by a mouse double click or a right click in addition to the drag and drop of the label of the domain so as to select the designation domain.

Referring to FIG. 5, it may be shown that the user selects the corresponding domain by a type 52 of checking an empty check box 51 through the user's click or touch, instead of the drag and drop type. In the case 53 of the general domain that should be selected at all times, the check is displayed by other colors, such that it may be informed to the user that the domain is selected at all times.

FIG. 6 illustrates an example in which the user interface for selecting the domain of the present invention is dynamically expressed. In FIG. 6, the tree structure illustrated in FIGS. 4 and 5 is more dynamically expressed, such that the user may more easily operate the user interface. The user clicks or touches the domain to be selected, such that the child nodes are shown as the sub domain of the corresponding domain and can be selected 61. The domains of the designation domain that is not selected are expressed 62 differently and are transmitted to the user.

FIG. 7 illustrates an example of the user interface for designating the designation domains having the equivalent structure that does not have a hierarchical structure. Each designation domain is represented by icons. The label name of the foregoing domain is displayed at the lower end of the icon to inform the user of which domain the icon corresponds to. In the case of the icon form, FIG. 7 illustrates that all the icons are displayed in the same form, but it is also possible to configure a 'Medical' icon in an intuitive form such as '+' so as to inform a user of the intuitively corresponding domain.

A designation possible domain display region 74 is present in the screen to inform a user of what the selectable domain region is and a selected designation domain display region 71 is present at the lower end of the screen to inform a user of what the designation domain that is currently selected and can be deselected. The user clicks or touches the domain 72 corresponding to the designation domain to be selected as the designation possible region display region or drags and drops the domain 72 to the selected designation domain display region 71 to select the designation domain. The selected designation domain may remove the icons in the existing designation possible domain display region to avoid the unnecessary re-selection of the user. Similarly, the selection is released by clicking or touching the previously selected designation domain or dragging and dropping the domain to the designation possible domain display region. The released designation domain may be shown in the designation possible domain display region 74 so as to be selected again.

In order for a user to easily access many designation domains, accessibility is increased by disposing a scroll bar 75. In the present exemplary embodiment, icons displayed in the designation possible domain display region are changed by the scroll operation are changed, but in the case of the designation domain display region, may not be changed regardless of the scroll for the selection through the icons.

FIG. 8 illustrates an example of the user interface for the designation domains having the hierarchical structure for application of FIG. 7. When the user selects the icons by clicking or touching the icons as a domain 81 for the designation domain wanting to see a lower designation domain, the icons for a lower domain of the corresponding domain are displayed at a lower region display portion. A lower domain display region 82 creates a boundary so that the region 82 is shown by being differentiated from upper designation domains. Icons 84 at this boundary are dragged and dropped to a designation domain display region 83 or may be selected as the designation domain using the click or touch operation.

When the upper designation domain is selected/released upon releasing the selection of the designation domain, the lower designation domain included in the upper designation domain may also be automatically selected/released to support the comprehensive selection/release.

In FIG. 8, when a user selects the icon 81 corresponding to the 'Seoul' domain, the sub domains of the 'Seoul' domain, for example, 'Seoul Hotel', 'Seoul Restaurant', and the like, are displayed. The user may touch the 'Seoul Hotel' 84 among the displayed icons or may drag and drop the 'Seoul Hotel' 84 to the designation domain display region 83 to select the Seoul Hotel related domain as the designation domain.

The display unit 100 according to the present embodiment may use the user information collected through the user terminal to check the user situations and display the domain recommended according to the checked situation information to the user. FIG. 9 illustrates an example of suggesting the suitable designation domain by checking the user situations.

The user information collected by the user terminal is a user's location information through a global positioning system (GPS) embedded in the user terminal, surrounding information through a camera, surrounding sound information recognized by a mike, and the like, and the user situations are checked using the above information. Therefore, the apparatus for speech recognition according to the present exemplary embodiment recommends the designation possible domain to the user through the information on the user situations. For example, Seoul of Korea may be recommended as the designation domain through the GPS of the user and when it is recognized by the camera that there are restaurants around the user, touring and restaurants can be recommended as the designation domain. When plane landing and taking off sounds as the surrounding sound are recognized by a mike, an airport may be recommended.

Therefore, in the present embodiment, the display unit 100 may emphasize the domains of the recommended designation domains and display the domains on the screen. It is possible to more rapidly and accurately obtain the speech recognition and automatic interpretation results by enabling the user to easily select only the necessary designation domain among the designation domains to prevent the addition of the recognition support data supporting the recognition of the unnecessary vocabularies or sentence expressions. To the contrary, the designation domains that are considered to be unnecessary have low availability by using the situation information are obscurely displayed or are not displayed to assist the simple recognition of the user and prevent the unnecessary selection.

Referring to FIG. 10, when the user location is recognized as Yeosu of Korea through the current GPS information 101, an icon 102 (Yeosu Hotel, Yeosu Restaurant, Yeosu Expo) corresponding to the Yeosu related domain is emphasized and displayed and an icon 103 (Medical) corresponding to the domain having low degree of association is obscurely displayed.

The domain display unit 100 according to the present embodiment can also display to the user the recognition data that is at least an example for exemplifying the speech recognition level designated according to the selection of the domain to the user.

Referring to FIG. 11, when the user wants to add the 'Conference' related domain, in the case in which the 'Conference' domain is selected as the designation domain by a recognition example portion 114, the level of the recognizable speech indirectly exemplifies that the sentence of the level like "Where is the nearest Gal-bi buffet from the 8th Advanced Computing (115) Conference hall?" can be recognized, thereby assisting the selection of the designation domain by the user.

In the exemplary embodiment, the user input unit 200 receives the domain selected by the user through the domain selection screen displayed on the display unit 100 and the communication unit 300 transmits the information on the selected domain to the speech recognition server 20.

The speech recognition server 20 performs the speech recognition by referring to the data corresponding to the domain selected by a user among the reference data for speech recognition stored in the DB 30 through information on the selected domain received. Next, the performed speech recognition result is transmitted to the user terminal 10.

The speech recognition server 20 according to the exemplary embodiment is described as a system that communicates with the user terminal 10 for speech recognition to receive the results from the speech recognition server, but the speech recognition server 20 is a speech recognition module in the terminal according to the system performance of the user terminal 10 and the DB 30 may be implemented as the internal memory. In this case, the communication unit 300 of the user terminal 10 may transmit the information on the selected domain to the internal speech recognition module rather than to the external speech recognition server 20.

That is, in this case, the components of the user terminal 10, that is, the display unit 100, the user input unit 200, and the communication unit 300 are operated as the interface module for the selection of the speech recognition domain and the speech recognition server is interlocked with the interface module so as to be implemented as the speech recognition module that performs the speech recognition.

The user interface that can be easily understood and simply correct the designation domain is provided to the users through the apparatus 10 for speech recognition according to the exemplary embodiment of the present invention to increase the adaptation for the changed environment, thereby improving the accuracy of the speech recognition and the automatic translation. Hereinafter, the domain designation method using the apparatus 10 for speech recognition according to the exemplary embodiment will be described.

Referring to FIG. 12, a method for designating a speech recognition region includes displaying a domain selection screen (S100), inputting domain selection (S200), and transmitting selection information (S300).

In the displaying of the domain selection screen (S100), the foregoing display unit 100 displays the screen for selecting the domain as a unit for the speech recognition region of the predetermined classification for the speech recognition designated by the speech recognition server 20 to a user.

In the inputting of the domain selection (S200), the foregoing user input unit 200 receives the selection of the domain from the user.

In the transmitting of the selection information (S300), the foregoing communication unit 300 transmits the selection information of the user for the domain to the speech recognition server 20.

The detailed operations of each process of the foregoing region designation method are the same as those described in the display unit 100, the user input unit 200, and the communication unit 300 as described above, and therefore the description thereof will be omitted.

The foregoing example mainly describes the operation for speech recognition, but the operation for speech recognition is essential for the automatic translation and therefore may also be applied to the automatic translation. For example, the speech recognition server 10 of FIG. 1 may be an automatic translation server.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:
1. An apparatus for speech recognition, comprising:
a display device including a screen configured to display a plurality of domains including a general domain and at least one another domain that are selectable by a user to support recognition of a speech, the general domain being associated with a database to be referenced to support the recognition of the speech using all subject matter areas and the at least one other domain being associated with a different database than the database of the general domain to be referenced to support the recognition of the speech using a specific subject matter area;
a user input device including at least one of a microphone, a touch screen, a keyboard, and a mouse configured to receive a selection of at least one domain from among the plurality of domains displayed by the user; and a communicator including an antenna configured to transmit information regarding the selection by the user of the at least one domain, wherein while the display device is displaying the plurality of domains, at least one of the plurality of domains is displayed with emphasis when information obtained in relation to a situation of the user indicates relation to the at least one of the plurality of domains to assist the user in the selection of at least one domain from among the plurality of domains, wherein the general domain and the at least one other domain are configured to have a hierarchical structure, and wherein a sentence is constructed using the at least one domain selected by the user in the selection to exemplify a level of recognizability of the speech according to the at least one domain selected by the user.

2. The apparatus of claim 1, wherein the display device displays the at least one domain of the plurality of domains selected by the user and a domain previously selected and deselected by the user.

3. The apparatus of claim 1, wherein the display device classifies a domain and displays the domain classified in a layer according to a speech recognition level.

4. The apparatus of claim 3, wherein the display device displays the at least one domain selected by the user among domains classified and displayed into a layer, respectively.

5. The apparatus of claim 3, wherein the layer according to the speech recognition level classifies a general region providing a basic speech recognition region according to a generation situation of the speech and a location.

6. The apparatus of claim 3, wherein the display device displays a domain corresponding to a lower layer of the at least one domain according to the selection of the user.

7. The apparatus of claim 1, wherein the screen displays at least one exemplified recognition data to the user for exemplifying a speech recognition level designated according to the selection of the at least one domain by the user.

8. The apparatus of claim 1, wherein at least some of the plurality of domains displayed include a displayed parent domain including at least one subdomain.

9. The apparatus of claim 1, wherein at least some of the parent domains displayed overlap other parent domains and at least one of the displayed subdomains is shared by more than one of the parent domains displayed.

10. The apparatus of claim 1, wherein the least one other domain has a different language dictionary for the recognition of the speech than the general domain.

11. A method for speech recognition, comprising:
determining a situation of a user;
displaying a plurality of domains including a general domain and at least one another domain on a screen that are selectable by the user to identify at least one of plurality of domains as a speech recognition region of a predetermined classification for recognition of a speech, and the displaying displays at least one of the plurality of domains with emphasis when information obtained in relation to the determining of the situation of the user indicates relation to the at least one of the plurality of domains to assist the user in a selection of at least one domain from among the plurality of domains;
receiving the selection by the user using at least one of a user input device including at least one of a microphone, a touch screen, a keyboard, and a mouse; and
transmitting, with an antenna of a communicator, information regarding the selection by the user of the at least one domain among the plurality of domains,
wherein the general domain is associated with a database to be referenced to support the recognition of the speech using all subject matter areas and the at least one other domain being associated with a different database than the database of the general domain to be referenced to support the recognition of the speech using a specific subject matter area, and
wherein the general domain and the at least one different domain are configured to have a hierarchical structure, and
wherein a sentence is constructed using the at least one domain selected by the user in the selection to exemplify a level of recognizability of the speech according to the at least one domain selected by the user.

12. The method of claim 11, wherein the displaying the plurality of domains on the screen includes displaying the at least one domain selected by the user and a domain previously selected and deselected by the user.

13. The method of claim 11, wherein the displaying the plurality of domains on the screen includes displaying a domain classified into a layer according to a speech recognition level.

14. The method of claim 13, wherein the displaying the plurality of domains on the screen includes displaying the at least one domain selected by the user among the plurality of domains sorted and displayed into the layer.

15. The method of claim 13, wherein the layer according to the speech recognition level has a hierarchical structure in which a general region providing a basic speech recognition region is sorted according to a generation situation of the speech and locations.

16. The method of claim 13, wherein the displaying the plurality of domains on the screen includes displaying a domain corresponding to a lower layer of the at least one domain according to the selection of the user.

17. The method of claim 13, wherein the displaying the plurality of domains on the screen includes displaying at least one exemplified recognition data for exemplifying a speech recognition level designated according to the selection of the at least one domain by the user.

18. A non-transient computer-readable recording medium in which a program executing a method on a computer is stored, the method comprising:
determining a situation of a user;
displaying a plurality of domains including a general domain and at least one another domain on a screen that are selectable by the user to identify at least one of the plurality of domains as a speech recognition region of a predetermined classification for recognition of a speech, and the displaying displays at least one of the plurality of domains with emphasis when information obtained in relation to the determining of the situation of the user indicates relation to the at least one of the plurality of domains to assist the user in a selection of at least one domain from among the plurality of domains;
receiving the selection by the user using at least one of a user input device including at least one of a microphone, a touch screen, a keyboard, and a mouse; and
transmitting, with an antenna of a communicator, information regarding the selection by the user of the at least one domain among the plurality of domains,
wherein the general domain is associated with a database to be referenced to support the recognition of the speech using all subject matter areas and the at least one other domain being associated with a different database than the database of the general domain to be referenced to support the recognition of the speech using a specific subject matter area, and wherein the general domain and the at least one different domain are configured to have a hierarchical structure, and wherein a sentence is constructed using the at least one domain selected by the user in the selection to exemplify a level of recognizability of the speech according to the at least one domain selected by the user.

19. An apparatus for speech recognition, comprising:

a hardware interface including a screen configured to:
- display a plurality of domains including a general domain and at least one another domain that are selectable by a user to support recognition of a speech,
- display at least one of the plurality of domains displayed with emphasis when information obtained in relation to a situation of the user indicates relation to the at least one of the plurality of domains to assist the user in the selection of at least one domain from among the plurality of domains,
- receive a selection by the user using at least one of a user input device including at least one of a microphone, a touch screen, a keyboard, and a mouse, and transmit information using an antenna regarding the selection by the user; and a speech recognition server configured to refer to data corresponding to the at least one domain selected by the user among reference data for speech recognition through the selection received to perform the recognition of the speech, wherein is associated with a database to be referenced to support the recognition of the speech using all subject matter areas and the at least one other domain being associated with a different database than the database of the general domain to be referenced to support the recognition of the speech using a specific subject matter area, and wherein the general domain and the at least one different domain are configured to have a hierarchical structure, and wherein a sentence is constructed using the at least one domain selected by the user in the selection to exemplify a level of recognizability of the speech according to the at least one domain selected by the user.

* * * * *